(12) United States Patent　　(10) Patent No.: US 12,607,776 B2

Mentak　　(45) Date of Patent: Apr. 21, 2026

(54) POLYMERS AND METHODS FOR OPHTHALMIC APPLICATIONS

(71) Applicant: Key Medical Technologies, Inc., San Ramon, CA (US)

(72) Inventor: Khalid Mentak, San Ramon, CA (US)

(73) Assignee: Key Medical Technologies, Inc., San Ramon, CA (US)

( * ) Notice: Subject to any disclaimer, the term of this patent is extended or adjusted under 35 U.S.C. 154(b) by 596 days.

(21) Appl. No.: 18/049,955

(22) Filed: Oct. 26, 2022

(65) Prior Publication Data

US 2023/0130090 A1　　Apr. 27, 2023

Related U.S. Application Data

(60) Provisional application No. 63/271,812, filed on Oct. 26, 2021.

(51) Int. Cl.
| | |
|---|---|
| *C08F 226/12* | (2006.01) |
| *C08F 220/16* | (2006.01) |
| *C08F 220/18* | (2006.01) |
| *C08F 220/20* | (2006.01) |
| *G02B 1/04* | (2006.01) |

(52) U.S. Cl.
CPC ........ *G02B 1/041* (2013.01); *C08F 220/1812* (2020.02); *C08F 226/12* (2013.01); *C08F 220/16* (2013.01); *C08F 220/18* (2013.01); *C08F 220/20* (2013.01)

(58) Field of Classification Search
CPC ............. C08F 220/1812; C08F 226/12; C08F 220/20; C08F 220/16; C08F 220/18
See application file for complete search history.

(56) References Cited

U.S. PATENT DOCUMENTS

| | | |
|---|---|---|
| 2013/0085230 A1 | 4/2013 | Hood et al. |
| 2015/0038612 A1 | 2/2015 | Mentak |

OTHER PUBLICATIONS

International Search Report and Written Opinion issued for International Application No. PCT/US2022/078733 dated Dec. 28, 2022, 12 pages.
International Preliminary Report on Patentability issued for International Application No. PCT/US2022/078733, mailed on May 10, 2024, 2 pages.

*Primary Examiner* — Kregg T Brooks
*Assistant Examiner* — David R. Foss
(74) *Attorney, Agent, or Firm* — Husch Blackwell LLP

(57) ABSTRACT

The disclosure relates to novel methods and materials particularly useful for ophthalmic applications and to methods for making and using the same. More particularly, the disclosure relates to relatively soft, optically transparent, foldable, high refractive index materials particularly suited for use in the production of intraocular lenses, contact lenses, and other ocular implants and to methods for manufacturing and implanting IOLs made therefrom.

7 Claims, No Drawings

POLYMERS AND METHODS FOR OPHTHALMIC APPLICATIONS

CROSS REFERENCE TO RELATED APPLICATIONS

This application is a non-provisional patent application of and claims priority to U.S. Provisional Patent Application No. 63/271,812 filed Oct. 26, 2021, which is incorporated herein by reference in its entirety.

FIELD

The disclosure relates to novel materials particularly useful for ophthalmic applications and methods for making and using the same. More particularly, the disclosure relates to relatively soft, optically transparent, foldable, high refractive index materials particularly suited for use in the production of intraocular lenses, contact lenses, and other ocular implants and to methods for manufacturing and using the same.

BACKGROUND

Since the 1940's optical devices in the form of intraocular lenses (IOLs) have been utilized as replacements for diseased or damaged natural ocular lenses. In most cases, an intraocular lens is implanted within an eye at the time of surgically removing the diseased or damaged natural lens, such as for example, in the case of cataracts. For decades, the preferred material for fabricating such intraocular lenses was poly(methyl methacrylate) (PMMA), which is a rigid, glassy polymer.

Softer, more flexible IOLs have gained in popularity in recent years due to their ability to be compressed, folded, rolled or otherwise deformed. Such softer IOLs may be deformed prior to insertion thereof through an incision in the cornea of an eye. Following insertion of the IOL in an eye, the IOL returns to its original, pre-folded shape due to the memory characteristics of the soft material. Softer, more flexible IOLs as just described may be implanted into an eye through an incision that is less than 4.0 mm i.e., much smaller than the 5.5 to 8.0 mm incision necessary to implant more rigid IOLs such as those made from PMMA. A larger incision is necessary for more rigid IOLs because the lens must be inserted through an incision in the cornea slightly larger than the diameter of the inflexible IOL optic portion. Accordingly, more rigid IOLs have become less popular in the market since larger incisions have occasionally been found to be associated with an increased incidence of postoperative complications, such as induced astigmatism.

With recent advances in small-incision cataract surgery, increased emphasis has been placed on developing soft, foldable polymer materials suitable for use in artificial IOLs. In general, these materials fall into one of three categories: hydrogels, silicones and low glass transition temperature acrylics.

A further recent advance in IOL implantation is the use of IOL injectors to implant the IOL in the eye. Cf., US 2007/0060925 "Preloaded IOLS Injector and Methods" to Pynson; US 2005/0222578 "IOL Injector" to Vaquero; and U.S. Pat. No. 7,988,701 "Preloaded IOL Injector" to Vaquero et al.; each of which are incorporated by reference herein in their entireties. Unfortunately injector implantation of an IOL generally proceeds more smoothly (i.e., with fewer surgical difficulties) the more rigid and thus generally the more handleable, the IOL.

Thus, for surgical purposes a more rigid lens is suggested. Usually this means a less than fully hydrated polymer lens is injected. As is well known, post-implantation hydration of an IOL changes, sometimes unpredictably, the refractive index (RI) of the lens. This subjects the physician and the injectable IOL implantation to uncertainty as to the surgical outcome. This invention in one aspect reduces or eliminates that uncertainty of surgical outcome in the context of a post-implantation hydratable or hydrating IOL polymer, particularly where implantation is accomplished using an IOL injector.

In general, high water content hydrogel materials have relatively low refractive indices, making them less desirable than other materials with respect to minimal incision size. Low refractive index materials require a thicker IOL optic portion to achieve a given refractive power. Silicone materials may have a higher refractive index than high-water content hydrogels, but tend to unfold too rapidly after being placed in the eye in a folded position. A too rapid unfolding of a folded lens can potentially damage the corneal endothelium and/or rupture the natural lens capsule and associated zonules. Low glass transition temperature acrylic materials are desirable because they typically have a high refractive index and unfold more slowly and more controllably than silicone materials when inserted into e.g., the lens capsule. Unfortunately, low glass transition temperature acrylic materials, which contain little or no water initially, may absorb pockets of water, in vivo, causing light reflections or "glistenings." Furthermore, it is difficult to achieve ideal folding and unfolding characteristics due to the temperature sensitivity of acrylic polymer memory.

U.S. Pat. No. 5,480,950 issued Jan. 2, 1996 teaches of high refractive index hydrogel materials having a hydrated equilibrium water content ("EWC") of at least 57% for use in the manufacture of IOLs. The high refractive index hydrogel materials are cross-linked polymers prepared from mixtures of N-vinylpyrrolidone, 4-vinylpyrimidine and a vinyl pyridine having equilibrium water contents up to 90% and refractive indexes of 1.560 to 1.594 in the dry state. The IOLs as described are not implanted in a hydrated state. Rather, the IOLs are implanted in a dry, folded and elongated state and hydrated in situ. The refractive indexes in the hydrated state as used in the eye are not provided. U.S. Patent Application Publication 2002/0049290 relates to high refractive index (RI) ophthalmic hydrogel materials U.S. Pat. No. 5,693,095 issued Dec. 2, 1997 teaches of high refractive index, low water content IOL materials. The materials taught in this particular patent are acrylic materials having an elongation of at least 150%. IOLs manufactured from a material having such elongation characteristics will not crack, tear or split when folded. However, such low water content acrylic materials have been found to be less biocompatible than other materials when manufactured into and used as IOL devices.

Hydrophobic acrylic (HA) polymers have become the materials of choice for IOL applications. The ophthalmic community has accepted this type of polymers as having good physical properties and acceptable biocompatibility in the eye. However, current IOLs made from conventional hydrophobic polymers do suffer from poor optical stability in ocular fluids (e.g. glistenings, optical artifacts) and low refractive indices (RI). The formation of unwanted glistenings and deposits in the bulk of hydrophobic polymers is attributed to uncontrolled water sorption and subsequent phase separation. Conventional homopolymers currently used to produce copolymers with high RIs (>1.50) absorb varying amounts of water in a sporadic fashion, creating phase separation, haze, and glistenings.

The interaction of HA polymers with water is a complex phenomenon regulated by the physical and chemical properties of the polymer and the nature of the aqueous environment. Researchers have been studying the sorption of water into HA polymers to better understand and design IOL polymers with improved optical properties. In addition to the properties found in conventional HA polymers, an ideal HA IOL material should have the following features:

RI greater than 1.4;

Adequate mechanical properties allowing machining with no cryogenic equipment. This is primarily controlled by Tg;

A chemical/physical structure optimized to absorb a small amount of water in a well-controlled fashion; and the size of the hydrated domains should not interfere with the optical properties.

The polymers disclosed herein have each of the desired features recited above.

SUMMARY

In one embodiment, the disclosure relates to a new family of high RI polymers particularly suitable for, but not limited to, IOL applications including foldable IOL applications. Materials disclosed herein are optically stable in ocular fluids and resist the formation of unwanted optical artifacts.

In one embodiment, the disclosure relates to a copolymer comprising: (1) monomers containing aromatic or fused ring structures to increase RI; (2) two or more hydrophilic monomers; and (3) monomers to improve mechanical properties, including but not limited to hydrophobic monomers.

In one embodiment, the unusual properties of the copolymers disclosed herein are achieved by creating nanoclusters of a generally hydrophilic polymer within a very hydrophobic polymer matrix. Water sorption is minimized and limited to the nanoclusters. In addition, the limited amount of water that is absorbed is well distributed and well dispersed within the matrix, preventing macrophase separation noted in prior art compositions. The approximate nanosize diameter of the clusters is in the range of 1.0 nm or less. Generally speaking the sizes of clusters operable in this invention will be of a diameter small enough so as to have little or interaction between visible light and the polymer network. The result is an optically clear material with stable optical properties.

The unusual properties of the copolymers disclosed herein are achieved by incorporating monomers from three major groups: (1) monomers containing aromatic or fused ring structures to increase RI; (2) two or more hydrophilic monomers; and (3) hydrophobic monomers to improve mechanical properties. The result is an optically clear material with stable optical properties.

This disclosure relates to novel copolymers particularly adaptable to intraocular lenses ("IOL"), contact lens, and other ophthalmic and optical applications. IOLs made from the materials of this disclosure have a very high refractive index, and may be machined or molded at around room temperature. IOLs of this disclosure may be folded and used to replace a defective natural lens of the eye by insertion through a small incision without the need for further processing or hydration. A particular advantage of the materials of this disclosure is their unusual hybrid character that prevents uncontrolled water sorption.

Foldable ophthalmic lens materials having controllable, uniform, relatively high water content and unexpectedly high refractive indices particularly suited for use as intraocular lenses (IOLs), or other ophthalmic devices such as but not limited to contact lenses, keratoprostheses and corneal rings or inlays, are the primary loci of the present invention.

In one embodiment, the disclosure relates to copolymer compositions comprising limited amounts of a monomer having an aromatic monomer and/or a carbazole and/or naphthyl moiety, carbazole, naphthalene, or a naphthyl group and/or a hydrophobic monomer. Carbazole and or naphthyl moiety monomers are added to the comonomer to increase the refractive index of the comonomer and increase the ability of the copolymer material to block blue light (wavelength up to 475 nm). A monomer having a surface tension generally in the range of 50 dyn/cm or less is used to create a very hydrophobic matrix. Two or more hydrophilic polymers are added to create a hydrophilic phase (in a process described below) for controlled water sorption.

In one embodiment, the disclosure relates to a copolymer comprising: (a) vinyl carbazole from 5% to 9% by weight of the copolymer; (b) hydroxyethyl acrylate from 15% to 22% by weight of the copolymer; (c) hydroxyethyl methacrylate from 4% to 8% by weight of the copolymer; and (d) lauryl methacrylate from 60% to 68% by weight of the copolymer.

In one embodiment, the disclosure relates to a copolymer comprising: (a) vinyl carbazole; (b) hydroxyethyl acrylate; (c) hydroxyethyl methacrylate; and (d) lauryl methacrylate, wherein the combined % weight of the hydroxyethyl acrylate and the hydroxyethyl methacrylate is at least twice the % weight of vinyl carbazole.

In one embodiment, the disclosure relates to a copolymer comprising: (a) vinyl carbazole; (b) hydroxyethyl acrylate; (c) hydroxyethyl methacrylate; and (d) lauryl methacrylate, wherein the combined % weight of the hydroxyethyl acrylate and the hydroxyethyl methacrylate is at least three times the % weight of vinyl carbazole.

In one embodiment, the disclosure relates to a copolymer comprising: (a) vinyl carbazole; (b) hydroxyethyl acrylate; (c) hydroxyethyl methacrylate; and (d) lauryl methacrylate, wherein the vinyl carbazole is less than 8% by weight of the copolymer.

In one embodiment, the disclosure relates to a copolymer comprising: (a) vinyl carbazole; (b) hydroxyethyl acrylate; (c) hydroxyethyl methacrylate; and (d) lauryl methacrylate, wherein the vinyl carbazole is less than 10% by weight of the copolymer.

In one embodiment, the disclosure relates to a copolymer comprising: a high refractive index monomer comprising an aromatic, carbazole or naphthyl moiety, carbazole, naphthalene or a naphthyl group; a hydrophobic monomer, and a first hydrophilic monomer and a second hydrophilic monomer.

In one embodiment, the disclosure relates to a copolymer comprising: a high refractive index monomer comprising an aromatic, carbazole or naphthyl moiety, carbazole, naphthalene or a naphthyl group; a hydrophobic monomer, a first hydrophilic monomer and a second hydrophilic monomer, wherein the combined % weight of the first hydrophilic monomer and the second hydrophilic monomer is at least twice the % weight of the high refractive index monomer.

In one embodiment, the disclosure relates to a copolymer comprising: a high refractive index monomer comprising an aromatic, carbazole or naphthyl moiety, carbazole, naphthalene or a naphthyl group; a hydrophobic monomer, a first hydrophilic monomer and a second hydrophilic monomer, wherein the combined % weight of the first hydrophilic monomer and the second hydrophilic monomer is at least three times the % weight of the high refractive index monomer.

In one embodiment, the disclosure relates to a copolymer comprising: a high refractive index monomer comprising an aromatic, carbazole or naphthyl moiety, carbazole, naphthalene or a naphthyl group; a hydrophobic monomer, and a first hydrophilic monomer and a second hydrophilic monomer, wherein the high refractive index monomer is less than 8% by weight of the copolymer.

In one embodiment, the disclosure relates to a copolymer comprising: a high refractive index monomer comprising an aromatic, carbazole or naphthyl moiety, carbazole, naphthalene or a naphthyl group; a hydrophobic monomer, and a first hydrophilic monomer and a second hydrophilic monomer, wherein the high refractive index monomer is less than 10% by weight of the copolymer.

In one embodiment, the copolymer further comprises a crosslinker. In another embodiment, the copolymer further comprises an ultraviolet light absorbing material.

In one embodiment, the vinyl carbazole is about 7% by weight of the copolymer. In another embodiment, the hydroxyethyl acrylate is about 18% by weight of the copolymer. In another embodiment, the hydroxyethyl methacrylate is about 6% by weight of the copolymer. In another embodiment, the lauryl methacrylate is about 64% by weight of the copolymer.

Accordingly, it is an object of the disclosure to provide a biocompatible IOL material having a high refractive index.

Another object of the disclosure is to provide an IOL material having a high refractive index- and controlled water sorption;

Still another object of the disclosure is to provide a method to allow accurate targeting of the power of the lens in-vivo.

Still another object of the disclosure is to provide an IOL material that is relatively simple to manufacture.

These and other objectives and advantages of the disclosure, some of which are specifically described and others that are not, will become apparent from the detailed description and the claims that follow.

DETAILED DESCRIPTION

All references to the Periodic Table of the Elements refer to the Periodic Table of the Elements published and copyrighted by CRC Press, Inc., 1990. Also, any references to a Group or Groups shall be to the Group or Groups reflected in this Periodic Table of the Elements using the IUPAC system for numbering groups. Unless stated to the contrary, implicit from the context, or customary in the art, all parts and percent are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the weight percent of components within compositions disclosed herein.

The term "about," as used herein in conjunction with a numerical range, modifies that range by extending the boundaries above and below the numerical values set forth. In one embodiment, the term "about" is used herein to modify a numerical value above and below the stated value by a variance of 10%. Therefore, about 50% includes the range of 45%-55%.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds. The term, "atom" refers to the smallest constituent of an element regardless of ionic state, that is, whether or not the same bears a charge or partial charge or is bonded to another atom.

As used herein, the terms "comprising," "including," "having" and like terms are not intended to exclude the presence of any additional component, step or procedure, whether or not the same is specifically disclosed. In order to avoid any doubt, all processes claimed through use of the term "comprising" may include one or more additional steps, pieces of equipment or component parts, and/or materials unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or," unless stated otherwise, refers to the listed members individually as well as in any combination.

As used herein, the term "composition" and like terms refer to a mixture or blend of two or more components.

As used herein, the term "copolymer" refers to polymers prepared from two different monomers, and polymers prepared from more than two different monomers, e.g., terpolymers, tetrapolymers, etc.

As used herein, the term diopter (D) refers to the reciprocal of the focal length of a lens in meters. For example, a 10 D lens brings parallel rays of light to a focus at (1/10) meter. After a patient's natural crystalline lens has been surgically removed, surgeons usually follow a formula, based on their own personal preference, to calculate a desirable diopter power (D) for the selection of an IOL for the patient to correct the patient's preoperational refractive error. For example, a myopia patient with −10 D undergoes cataract surgery and IOL implantation; the patient can see at a distance well enough even without glasses. This is because the surgeon has taken the patient's −10 D near-sightedness into account when choosing an IOL for the patient.

As used herein, an "intraocular lens" refers to a polymeric phakic or aphakic (also referred to in the art as pseudophakic), vision-correcting device that may be implanted into a patient's eye. Phakic lenses are used to correct refractive errors such as myopia (near-sightedness), hyperopia (far-sightedness) and astigmatism (blurred vision due to poor light focusing on the retina due to an irregularly shaped cornea or, in some instances, an irregularly shaped natural lens). The natural lens remains in place when a phakic lens is implanted while the lens is removed prior to implantation of pseudophakic lens. An aphakic or pseudophakic lens is inserted in the eye subsequent to removal of the natural lens due to disease, most often a cataract; that is, clouding of the natural lens. Either type of lens may be implanted in the anterior chamber in front of the iris or in the posterior chamber behind the iris and in front of the natural lens or in the region where the natural lens was before removal. While intraocular lenses may be "hard," that is relatively inflexible, or "soft," i.e., relatively flexible but not foldable, for the purpose of this invention the presently preferred lens is a foldable acrylic polymer lens. A foldable lens is one that is sufficiently flexible that it can be folded into a smaller configuration to permit its implantation into the eye through a much smaller incision that is necessary for hard or soft lenses. That is, while hard and soft lenses may require a 6 mm or larger incision, a foldable lens usually requires only a 3 mm or even smaller incision. U.S. Pat. No. 7,789,509 to Mentak, U.S. Pat. No. 6,281,319 to Mentak, U.S. Pat. No. 6,635,731 to Mentak, U.S. Pat. No. 6,635,732 to Mentak, and U.S. Pat. No. 7,083,645 to Mentak, U.S. Pat. No. 7,789,509 to Mentak et al., and U.S. Pat. No. 7,399,811 also to Mentak et al. are all incorporated herein by reference in their entirety.

As used herein, "optical component," "optical assembly" or "optical subassembly" shall mean a portion of, or a completed, ophthalmic device, assembly or subassembly. Non-limiting examples of optical components include lens bodies, optic bodies, haptics; IOL components.

As used herein, "optical polymer" refers to a polymer that is suitable for implantation into a patient's eye and that is capable of addressing ophthalmic conditions of the lens of the eye such as, without limitation, myopia, hyperopia, astigmatism and cataracts. In general such a polymer will be biocompatible, i.e., it will not cause any inflammatory, immunogenic, or toxic condition when implanted, it will form a clear, transparent, colorless (unless intentionally colored for a particular application) film-like membrane, and it will have a refractive index greater than about 1.4, preferably greater than about 1.5 and presently most preferably greater than about 1.55.

As used herein, the term "polymer" (and like terms) is a macromolecular compound prepared by reacting (i.e., polymerizing) monomers of the same (homopolymers) or different type (copolymers). "Polymer" includes homopolymers and copolymers.

As used herein, the refractive index or index of refraction of a material is a dimensionless number that describes how light propagates through that medium. It is defined as: where c is the speed of light in vacuum and v is the phase velocity of light in the medium. For example, the refractive index of water is 1.333, meaning that light travels 1.333 times faster in vacuum than in the water.

The apparatuses and methods disclosed herein will now be described more fully hereinafter with reference to the accompanying drawings, in which embodiments of the disclosure are shown. The apparatuses and methods disclosed herein may, however, be embodied in many different forms and should not be construed as limited to the embodiments set forth herein. Rather, these embodiments are provided so that the disclosure will be thorough and complete and will fully convey the scope of the invention to those skilled in the art.

It will be appreciated by those skilled in the art that the set of features and/or capabilities may be readily adapted within the context of a standalone weapons sight, front-mount or rear-mount clip-on weapons site, and other permutations of filed deployed optical weapons sights. Further, it will be appreciated by those skilled in the art that various combinations of features and capabilities may be incorporated into add-on modules for retrofitting existing fixed or variable weapons sights of any variety.

It will be understood that when an element or layer is referred to as being "on," "connected to" or "coupled to" another element or layer, it can be directly on, connected or coupled to the other element or layer. Alternatively, intervening elements or layers may be present. In contrast, when an element is referred to as being "directly on," "directly connected to" or "directly coupled to" another element or layer, there are no intervening elements or layers present.

Like numbers refer to like elements throughout. As used herein, the term "and/or" includes any and all combinations of one or more of the associated listed items.

It will be understood that, although the terms first, second, etc., may be used herein to describe various elements, components, regions, and/or sections, these elements, components, regions, and/or sections should not be limited by these terms. These terms are only used to distinguish one element, component, region, or section from another element, component, region, or section. Thus, a first element, component, region, or section discussed below could be termed a second element, component, region, or section without departing from the disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

Materials of the disclosure with high refractive indexes are desirable to allow manufacturers to manufacture thinner IOLs. A thin IOL or thin IOL optic is critical in enabling a surgeon to minimize incision size. Keeping the surgical incision size to a minimum reduces intraoperative trauma and postoperative complications. A thin IOL is also critical for accommodating certain anatomical locations in the eye such as the anterior chamber and the ciliary sulcus. IOLs may be placed in the anterior chamber for increasing visual acuity in both aphakic and phakic eyes and placed in the ciliary sulcus for increasing visual acuity in phakic eyes.

The preferred materials of the disclosure have the flexibility required to allow the same to be folded or deformed so that IOLs made therefrom may be introduced into an eye through the smallest possible incision.

The novel materials of the disclosure are copolymers, trimers, tetramers, etc., comprising at least three monomeric components: (1) monomers containing aromatic or fused ring structures to increase RI; (2) two or more hydrophilic monomers; and (3) a hydrophobic monomer. A cross linker generally is included as is a UV absorber.

The compositions comprise multimers including: a first monomer containing an aromatic, carbazole and or naphthyl moiety, the aromatic/carbazole/naphthyl moiety monomer being present in the composition at a concentration of at least less than 12% and preferably less than 10%. In one embodiment, the aromatic/carbazole/naphthyl moiety monomer is present in the composition at a concentration from 5% to 7%.

The composition also two or more hydrophilic monomers. In one embodiment, the composition includes a first hydrophilic monomer at a concentration from 5 to 10%. In one embodiment, the composition includes a first hydrophilic monomer at a concentration of about 6%. In one embodiment, the composition includes a second hydrophilic monomer at a concentration from 10% to 20%. In one embodiment, the composition includes a second hydrophilic monomer at a concentration of 18%.

In one embodiment, the composition includes at least about 24 weight % of two hydrophilic monomers. In another embodiment, the composition includes at least about 20-30 weight % of two hydrophilic monomers.

Suitable hydrophilic monomers (i.e., monomers whose homopolymers are hydrophilic in accordance with this disclosure) include but are not limited to 2-hydroxy-ethylacrylate, 2-hydroxyethylmethacrylate, acrylamide, N-ornithine acrylamide, N-(2-hydroxypropyl)acrylamide, polyethyleneglycol acrylates, polyethyleneglycol methacrylates, N-vinyl pyrolidone, N-phenylacrylamide, dimethylaminopropyl methacrylamide, acrylic acid, benzylmethacrylamide, 4-hydroxybutylmethacrylate, glycerol mono methacrylate, glycerol mono acrylate, 2-sulfoethylmethacrylate, phenoxyethyl acrylate, phenoxy ethyl methacrylate, 2-(2-ethoxyethoxy)ethyl acrylate, 2-(2-ethoxyethoxy)ethyl methacrylate, furfuryl acrylate, furfuryl methacrylate, and methylthioethylacrylamide.

The composition further includes a hydrophobic homopolymer, the hydrophobicity being defined as the homopolymer having a surface tension of about 50 dyn/cm or less, the hydrophobic monomer being present in the copolymer in an amount of at least about 50 weight percent, preferably about 55-70 weight %. In one embodiment, the hydrophobic monomer is present in the copolymer in an amount of at least about 60 weight percent. In one embodiment, the hydrophobic monomer is present in the copolymer in an amount of 64 weight percent.

Suitable hydrophobic monomers (i.e., monomers whose homopolymers are hydrophobic in accordance with this invention) include but are not limited to: Lauryl methacrylate, Lauryl acrylate, 2-ethylhexyl acrylate, 2-ethylhexyl methacrylate, n-decyl acrylate, n-decyl methacrylate, hexyl acrylate, hexyl methacrylate, stearyl acrylate, stearyl methacrylate, isodecyl acrylate, isodecyl methacrylate, isobornyl acrylate, isobornyl methacrylate, vinyl laurate, vinyl stearate, 1-hexadecyl acrylate, 1-hexadecyl methacrylate, n-myristyl acrylate, n-myristyl methacrylate, n-dodecyl methacrylamide, butyl acrylate, n-butyl methacrylate, isooctyl acrylate, isotridecyl acrylate, isooctyl methacrylate, and isotridecyl methacrylate.

The composition then includes a crosslinking monomer, the crosslinking monomer being present at a concentration in the range up to 10 weight percent, preferably of about 1 weight % to about 8 weight %.

Suitable crosslinkers include for example but are not limited to ethylene glycol dimethacrylate (EGDMDA), diethylene glycol dimethacrylate, triethylene glycol dimethacrylate and poly(ethylene glycol) dimethacrylate wherein ethylene glycol dimethacrylate is preferred. Suitable initiators include for example but are not limited to azobis (isobutyronitrile), 2,2'-azobis(2,4-dimethylvaleronitdle), 2,2'-azobis (methylbutyronitrile), 1,1'-azobis (cyanocyclohexane), di-t-butyl peroxide, dicumyl peroxide, t-butyl-cumyl peroxide, 2,5-dimethyl-2,5-bis(2-ethylhexanoyl peroxy)hexane, t-butyl peroxyneodecanote, t-butyl peroxy 2-ethylhexanoate, di(4-t-butyl cyclohexyl) peroxydicarbonate, t-butyl peroxypivalate, decanoyl peroxide, lauroyl peroxide, benzoyl peroxide, 2,4-pentanedione peroxide, di(n-propyl) peroxydicarbonate, t-amyl peroxyneodecanoate and t-butyl peroxyacetate wherein 2,2'-azobis(isobutyronitrile) is preferred. Suitable ultraviolet light absorbers include for example but are not limited to beta-(4-benzotriazoyl-3-hydroxyphenoxy) ethyl acrylate, 4-(2-acryloxyethoxy)-2-hydroxybenzophenone, 4-methacryloxy-2-hydroxybenzophenone, 2-(2'-methacryloxy-5'-methylphenyl) benzotriazole, 2-(2'-hydroxy-5'-methacryoxyethylphenyl)-2H-benzotriazole, 2-[3'-tert-Butyl-2'-hydroxy-5'-(3"-methacryloyloxypropyl)phenyl]-5-chloro-benzotriazole, 2-(3'-tert-Butyl-5'-[3"-dimethyl-vinyisilylpropoxy)-2'-hydroxyphenyl]-5-methoxybenzotriazole, 2-(3'-Allyl-2'-hydroxy-5'-methylphenyl) benzotriazole, 2-[3'-tert-Butyl-2'-hydroxy-5'-(3" methacryloyloxypropoxy) phenyl]-5-methoxybenzotriazole, and 2-[3'-tert-Butyl-2'-hydroxy-5'-(3"-methacryloyloxy-propoxy) phenyl]-5-chlorobenzotriazole wherein beta-(4-benzotriazoyl-3-hydroxyphen-oxy)ethyl acrylate is the preferred ultraviolet light absorber.

A UV absorber optionally may be added to the copolymer compositions. A novel, preferred, UV/blue light absorber, i.e., vinyl anthracene, may be added to the copolymer compositions. Conventional UV absorbers such as a vinyl benzophenone or a vinyl benzotriazole also may be used.

A monomeric dye capable of copolymerizing with the hydrophobic and the hydrophilic monomers optionally may be added to the copolymer to attenuate specific 30 wavelengths of light. Such dyes include but are not limited to those containing vinyl groups and are capable of absorbing violet, blue, red, and green light in the range of 400-700 nm.

Examples of such monomeric dyes include but are not limited to: Disperse Red 13 acrylate; Disperse Orange 3 acrylamide; Disperse Orange 3 methacrylamide; Disperse Red 1 methacrylate; Disperse Red 1 acrylate; Disperse Red 13 methacrylate; Disperse yellow 7 acrylate; Disperse yellow 7 methacrylate; Ethyl trans-α-cyano-3-indoleacrylate; and [(S)-(–)-1-(4-Nitrophenyl)-2-pyrrolidinemethyl]acrylate.

EXAMPLES

Example 1

Although values of the relevant properties for some of these monomers have been reported in the literature, the information tends to be inconsistent and incomplete. The first step involved evaluating the physical properties of the homopolymers in a reliable and systematic fashion. The homopolymers were synthesized using the same method used for copolymerization (described below) to ensure the viability of the measured parameters. The following table summarizes the results:

TABLE 1

Summary of physical properties of homopolymers.

| Monomers | RI | Tg(° C.) |
|---|---|---|
| Vinyl carbazole (VC) | 1.688 | 138 |
| Benzyl acrylate (BA) | 1.554 | 7 |
| Benzyl methacrylate (BMA) | 1.567 | 56 |
| Hydroxyethyl acrylate (HEA) | 1.476 | −15 |
| Hydroxyethyl methacrylate (HEMA) | 1.512 | 54 |
| Lauryl Methacrylate (LM) | 1.445 | −55 |
| Ethylhexyl acrylate (EHA) | 1.475 | −53 |
| Ethylhexyl methacrylate (EHMA) | 1.483 | −12 |
| Cyclohexyl acrylate (CHA) | 1.471 | 20 |
| Cyclohexyl methacrylate (CHMA) | 1.479 | 89 |
| Stearyl acrylate (SA) | 1.461 | 35 |
| Stearyl methacrylate (SMA) | 1.472 | 78 |
| N-hexyl acrylate (n-HA) | 1.465 | −8 |
| N-hexyl methacrylate (n-HMA) | 1.475 | 56 |
| Phenoxyethyl acrylate (PEA) | 1.514 | 7 |
| Ethyl acrylate (EA) | 1.474 | −24 |
| Ethyl methacrylate (EMA) | 1.485 | 15 |
| Ethyleneglycol dimethcarylate (EGDM) | 1.497 | 54 |

Example 2

Copolymerization

Copolymerization was conducted based on reactivity ratio considerations and the following design input:
(1) RI>1.51;
(2) 30° C.>Tg>0° C.;
(3) Adequate machinability without cryogenics; and
(4) No haze or glistenings (75° C. in saline for 30 days).

In view of the large number of copolymer compositions with possible good combination of properties, the research focused on incorporating approximately 25-30% hydrophilic monomer and the highest % of hydrophobic monomer possible. A systematic evaluation of a large number of formulations including screening and optimization was conducted.

Polymerization Conditions

Polymerization is conducted in convection ovens at gradual temperatures ranging from 70° C. to 120° C. Sonication for 10-20 minutes was found to reduce haze for some formulations.

Evaluation

Polymer samples are evaluated for several properties including those relevant to IOL manufacturing:

(1) RI: Measured in air using Index Instrument CLR 12-70;

(2) Tg: Measured by DSC;

(3) Optical stability: Samples measuring 1 cm×1 cm were soaked in saline at 75° C. for 30 days. Haze and glistenings are graded on a scale 0 to 3. An ideal polymer would be graded H0/G0, meaning no haze (H0) or glistenings (G0); and (4) Machining: Selected samples are machined using a standard lathe and the viability of the surface is evaluated.

Tables 2A and 2B provide a summary of the tested formulations. All formulations in Tables 2A and 2B contain 0.5% Benzo.

TABLE 2A

RI, Tg and Optical stability for various tested formulations.

| Monomer | 1 | 2 | 3 | 4 | 5 | 6 | 7 | 8 | 9 | 10 | 11 | 12 |
|---|---|---|---|---|---|---|---|---|---|---|---|---|
| Vinyl carbazole (VC) | 0.07 | 0.15 | 0.2 | 0.25 | 0.1 | 0.15 | 0.2 | 0.25 | | | | |
| Benzyl acrylate (BA) | | | | | | | | | 0.2 | 0.25 | 0.3 | 0.5 |
| Benzyl methacrylate (BMA) | | | | | | | | | | | | |
| Hydroxyethyl acrylate (HEA) | 0.18 | | | | 0.3 | 0.3 | 0.3 | 0.3 | | | | |
| Hydroxyethyl methacrylate (HEMA) | 0.06 | 0.3 | 0.3 | 0.3 | | | | | 0.3 | 0.3 | 0.3 | 0.3 |
| Lauryl Methacrylate (LM) | 0.64 | 0.52 | 0.47 | 0.42 | 0.57 | 0.52 | 0.47 | 0.42 | | | | |
| Ethylhexyl acrylate (EHA) | | | | | | | | | 0.47 | 0.42 | 0.37 | 0.17 |
| Ethylhexyl methacrylate (EHMA) | | | | | | | | | | | | |
| Cyclohexyl acrylate (CHA) | | | | | | | | | | | | |
| Cyclohexyl methacrylate (CHMA) | | | | | | | | | | | | |
| Stearyl acrylate (SA) | | | | | | | | | | | | |
| Stearyl methacrylate (SMA) | | | | | | | | | | | | |
| N-hexyl acrylate (n-HA) | | | | | | | | | | | | |
| N-hexyl methacrylate (n-HMA) | | | | | | | | | | | | |

TABLE 2A-continued

RI, Tg and Optical stability for various tested formulations.

| | | | | | | | | | | | | |
|---|---|---|---|---|---|---|---|---|---|---|---|---|
| Phenoxyethyl acrylate (PEA) | | | | | | | | | | | | |
| Ethyl acrylate (EA) | | | | | | | | | | | | |
| Ethyl methacryalte (EMA) | | | | | | | | | | | | |
| Ethyleneglycol dimethcarylate (EGD) | 0.045 | 0.045 | 0.045 | 0.045 | 0.045 | 0.045 | 0.045 | 0.045 | 0.045 | 0.045 | 0.045 | 0.045 |
| RI | 1.493 | 1.520 | 1.532 | 1.544 | 1.497 | 1.509 | 1.521 | 1.531 | 1.520 | 1.524 | 1.527 | 1.542 |
| Tg | 12 | 12 | 22 | 31 | −18 | −9 | 1 | 11 | 16 | 17 | 17 | 21 |
| Optical Stability | H0/G0 | H1/G0 | H1/G0 | H1/G1 | H1/G0 | H0/G1 | H0/G1 | H0/G1 | H2/G2 | H2/G2 | H2/G2 | H2/G2 |

| Monomer | 13 | 14 | 15 | 16 | 17 | 18 | 19 | 20 | 21 | 22 | 23 | 24 |
|---|---|---|---|---|---|---|---|---|---|---|---|---|
| Vinyl carbazole (VC) | | | | | | | | | | | | |
| Benzyl acrylate (BA) | 0.1 | 0.15 | 0.2 | 0.25 | | | | | | | | |
| Benzyl methacrylate (BMA) | | | | | 0.2 | 0.25 | 0.3 | 0.5 | 0.1 | 0.15 | 0.2 | 0.25 |
| Hydroxyethyl acrylate (HEA) | 0.3 | 0.3 | 0.3 | 0.3 | | | | | 0.3 | 0.3 | 0.3 | 0.3 |
| Hydroxyethyl methacrylate (HEMA) | | | | | 0.3 | 0.3 | 0.3 | 0.3 | | | | |
| Lauryl Methacrylate (LM) | | | | | | | | | | | | |
| Ethylhexyl acrylate (EHA) | | | | | | | | | | | | |
| Ethylhexyl methacrylate (EHMA) | 0.57 | 0.52 | 0.47 | 0.42 | | | | | | | | |
| Cyclohexyl acrylate (CHA) | | | | | | | | | | | | |
| Cyclohexyl methacrylate (CHMA) | | | | | | | | | | | | |
| Stearyl acrylate (SA) | | | | | | | | | | | | |
| Stearyl methacrylate (SMA) | | | | | | | | | | | | |
| N-hexyl acrylate (n-HA) | | | | | | | | | | | | |
| N-hexyl methacrylate (n-HMA) | | | | | | | | | | | | |
| Phenoxyethyl acrylate (PEA) | | | | | | | | | | | | |
| Ethyl acrylate (EA) | | | | | 0.47 | 0.42 | 0.37 | 0.17 | 0.57 | 0.52 | 0.47 | 0.42 |
| Ethyl methacryalte (EMA) | | | | | | | | | | | | |
| Ethyleneglycol dimethcarylate (EGD) | 0.045 | 0.045 | 0.045 | 0.045 | 0.045 | 0.045 | 0.045 | 0.045 | 0.045 | 0.045 | 0.045 | 0.045 |
| RI | 1.502 | 1.506 | 1.510 | 1.513 | 1.519 | 1.523 | 1.528 | 1.547 | 1.499 | 1.503 | 1.508 | 1.513 |
| Tg | −7 | −9 | −8 | −7 | 17 | 21 | 25 | 41 | −12 | −8 | −4 | 0 |
| Optical Stability | H2/G2 | H2/G2 | H2/G2 | H2/G2 | H2/G2 | H0/G2 | H0/G2 | H0/G1 | H3/G3 | H2/G3 | H2/G2 | H2/G2 |

TABLE 2B

RI, Tg and Optical stability for various tested formulations

| Monomer | 25 | 26 | 27 | 28 | 29 | 30 | 31 | 32 | 33 | 34 | 35 | 36 |
|---|---|---|---|---|---|---|---|---|---|---|---|---|
| Vinyl carbazole (VC) | 0.1 | 0.15 | 0.2 | 0.25 | 0.1 | 0.15 | 0.2 | 0.25 | | | | |
| Benzyl acrylate (BA) | | | | | | | | | 0.2 | 0.25 | 0.3 | 0.5 |
| Benzyl methacrylate (BMA) | | | | | | | | | | | | |
| Hydroxyethyl acrylate (HEA) | | | | | 0.3 | 0.3 | 0.3 | 0.3 | | | | |
| Hydroxyethyl methacrylate (HEMA) | 0.3 | 0.3 | 0.3 | 0.3 | | | | | 0.3 | 0.3 | 0.3 | 0.3 |
| Lauryl Methacrylate (LM) | | | | | | | | | | | | |
| Ethylhexyl acrylate (EHA) | 0.57 | 0.52 | 0.47 | 0.42 | 0.57 | 0.52 | 0.47 | 0.42 | | | | |
| Ethylhexyl | | | | | | | | | 0.47 | 0.42 | 0.37 | 0.17 |

TABLE 2B-continued

RI, Tg and Optical stability for various tested formulations

| | | | | | | | | | | | | |
|---|---|---|---|---|---|---|---|---|---|---|---|---|
| methacrylate (EHMA) | | | | | | | | | | | | |
| Cyclohexyl acrylate (CHA) | | | | | | | | | | | | |
| Cyclohexyl methacrylate (CHMA) | | | | | | | | | | | | |
| Stearyl acrylate (SA) | | | | | | | | | | | | |
| Stearyl methacrylate (SMA) | | | | | | | | | | | | |
| N-hexyl acrylate (n-HA) | | | | | | | | | | | | |
| N-hexyl methacrylate (n-HMA) | | | | | | | | | | | | |
| Phenoxyethyl acrylate (PEA) | | | | | | | | | | | | |
| Ethyl acrylate (EA) | | | | | | | | | | | | |
| Ethyl methacrylte (EMA) | | | | | | | | | | | | |
| Ethyleneglycol dimethcarylate (EGD) | 0.045 | 0.045 | 0.045 | 0.045 | 0.045 | 0.045 | 0.045 | 0.045 | 0.045 | 0.045 | 0.045 | 0.045 |
| RI | 1.522 | 1.532 | 1.542 | 1.553 | 1.510 | 1.521 | 1.532 | 1.542 | 1.519 | 1.523 | 1.526 | 1.541 |
| Tg | 0 | 10 | 20 | 29 | −20 | −11 | 4 | 13 | 18 | 19 | 19 | 23 |
| Optical Stability | H2/G2 | H1/G0 | H1/G0 | H1/G0 | H2/G1 | H2/G1 | H1/G0 | H1/G1 | H2/G1 | H1/G1 | H1/G1 | H1/G1 |

| Monomer | 37 | 38 | 39 | 40 | 41 | 42 | 43 | 44 | 45 | 46 | 47 | 48 |
|---|---|---|---|---|---|---|---|---|---|---|---|---|
| Vinyl carbazole (VC) | | | | | | | | | | | | |
| Benzyl acrylate (BA) | 0.1 | 0.15 | 0.2 | 0.25 | | | | | | | | |
| Benzyl methacrylate (BMA) | | | | | 0.2 | 0.25 | 0.3 | 0.5 | 0.1 | 0.15 | 0.2 | 0.25 |
| Hydroxyethyl acrylate (HEA) | 0.3 | 0.3 | 0.3 | 0.3 | | | | | 0.3 | 0.3 | 0.3 | 0.3 |
| Hydroxyethyl methacrylate (HEMA) | | | | | 0.3 | 0.3 | 0.3 | 0.3 | | | | |
| Lauryl Methacrylate (LM) | | | | | | | | | | | | |
| Ethylhexyl acrylate (EHA) | | | | | | | | | | | | |
| Ethylhexyl methacrylate (EHMA) | 0.57 | 0.52 | 0.47 | 0.42 | | | | | | | | |
| Cyclohexyl acrylate (CHA) | | | | | | | | | | | | |
| Cyclohexyl methacrylate (CHMA) | | | | | | | | | | | | |
| Stearyl acrylate (SA) | | | | | | | | | | | | |
| Stearyl methacrylate (SMA) | | | | | | | | | | | | |
| N-hexyl acrylate (n-HA) | | | | | 0.47 | 0.42 | 0.37 | 0.17 | 0.57 | 0.52 | 0.47 | 0.42 |
| N-hexyl methacrylate (n-HMA) | | | | | | | | | | | | |
| Phenoxyethyl acrylate (PEA) | | | | | | | | | | | | |
| Ethyl acrylate (EA) | | | | | | | | | | | | |
| Ethyl methacrylte (EMA) | | | | | | | | | | | | |
| Ethyleneglycol dimethcarylate (EGD) | 0.045 | 0.045 | 0.045 | 0.045 | 0.045 | 0.045 | 0.045 | 0.045 | 0.045 | 0.045 | 0.045 | 0.045 |
| RI | 1.501 | 1.505 | 1.509 | 1.512 | 1.513 | 1.519 | 1.524 | 1.544 | 1.492 | 1.498 | 1.503 | 1.508 |
| Tg | −5 | −4 | −3 | −2 | 29 | 32 | 36 | 48 | 2 | 5 | 9 | 12 |
| Optical Stability | H3/G3 | H2/G2 | H1/G1 | H1/G1 | H1/G2 | H1/G1 | H1/G3 | H0/G3 | H1/G1 | H1/G1 | H1/G1 | H1/G1 |

Example 3

After several iterations, a few formulations were selected for further studies mainly based on optical stability. The following composition was obtained by adjusting the mechanical properties of formulations with adequate optical stability (Tg, machining).

| Monomers | % |
|---|---|
| VC | 7.0 |
| HEA | 18.0 |
| LM | 64.0 |
| HEMA | 6.0 |
| EGDM | 4.5 |
| UV Absorber | 0.5 |
| Properties | |
| RI | 1.493 |
| Tg | 12° C. |
| Machining Temp | −30° C. |

What is claimed is:

1. A copolymer comprising: (a) vinyl carbazole from 5% to 9% by weight of the copolymer; (b) hydroxyethyl acrylate from 15% to 22% by weight of the copolymer; (c) hydroxyethyl methacrylate from 4% to 8% by weight of the copolymer; and (d) lauryl methacrylate from 60% to 68% by weight of the copolymer.

2. The copolymer of claim 1, wherein the copolymer further comprises a crosslinker.

3. The copolymer of claim 1, wherein the copolymer further comprises an ultraviolet light absorbing material.

4. The copolymer of claim 1, wherein the vinyl carbazole is about 7% by weight of the copolymer.

5. The copolymer of claim 1, wherein the hydroxyethyl acrylate is about 18% by weight of the copolymer.

6. The copolymer of claim 1, wherein the hydroxyethyl methacrylate is about 6% by weight of the copolymer.

7. The copolymer of claim 1, wherein the lauryl methacrylate is about 64% by weight of the copolymer.

* * * * *